United States Patent
Gantenbein et al.

(10) Patent No.: US 9,211,552 B2
(45) Date of Patent: Dec. 15, 2015

(54) FOAM DISPENSING GUN

(71) Applicant: Fomo Products, Inc., Norton, OH (US)

(72) Inventors: Stefan Gantenbein, Medina, OH (US); Thomas Fishback, Cuyahoga Falls, OH (US); Sara Jonas, Streetsboro, OH (US); Douglas Caffoe, Aurora, OH (US); John McQuaid, Akron, OH (US); Timothy Shoemaker, Akron, OH (US); Kerry Armes, Akron, OH (US); Christopher Miedza, Bay Village, OH (US); Scott E. Mizer, Cleveland, OH (US); Brain Milliff, Cleveland, OH (US); Michael J. Maczuzak, Bratenahl, OH (US)

(73) Assignee: Fomo Products, Inc., Norton, OH (US)

( * ) Notice: Subject to any disclaimer, the term of this patent is extended or adjusted under 35 U.S.C. 154(b) by 93 days.

(21) Appl. No.: 13/955,793

(22) Filed: Jul. 31, 2013

(65) Prior Publication Data

US 2014/0034756 A1 Feb. 6, 2014

Related U.S. Application Data

(60) Provisional application No. 61/679,240, filed on Aug. 3, 2012.

(51) Int. Cl.
*B05B 7/04* (2006.01)
*B05B 7/00* (2006.01)
*B05C 17/005* (2006.01)
*B29B 7/74* (2006.01)

(52) U.S. Cl.
CPC ............. *B05B 7/0408* (2013.01); *B05B 7/0025* (2013.01); *B05C 17/00506* (2013.01); *B29B 7/7419* (2013.01); *B29B 7/7438* (2013.01)

(58) Field of Classification Search
CPC .. B05B 7/0408; B05B 7/0025; B29B 7/7438; B29B 7/7419; B05C 17/00506
USPC .......................... 239/407, 413, 428, 526–528
See application file for complete search history.

(56) References Cited

U.S. PATENT DOCUMENTS

| | | | | |
|---|---|---|---|---|
| 2,635,010 A | * | 4/1953 | Sanders | 239/415 |
| 3,146,950 A | * | 9/1964 | Lancaster | 239/128 |
| 3,650,479 A | | 3/1972 | Liedberg | |
| 3,838,578 A | | 10/1974 | Sakasegawa et al. | |
| 5,242,115 A | | 9/1993 | Brown | |
| 5,462,204 A | | 10/1995 | Finn | |
| 5,529,245 A | * | 6/1996 | Brown | 239/390 |
| 6,158,624 A | | 12/2000 | Grigg et al. | |
| 6,182,868 B1 | | 2/2001 | Hurray et al. | |
| 6,431,468 B1 | * | 8/2002 | Brown et al. | 239/526 |
| 8,177,451 B2 | | 5/2012 | Park | |
| 2005/0035220 A1 | * | 2/2005 | Brown | 239/432 |
| 2006/0192033 A1 | | 8/2006 | Dansizen et al. | |
| 2007/0095939 A1 | | 5/2007 | Saunders et al. | |

(Continued)

OTHER PUBLICATIONS

Froth-Pak™ Ultra Premium Foam Insulation System bearing a copyright date of 2014 on the last page.
Froth-Pak™ Ultra Premium Foam Insulation Manual bearing an edition date of 2015 on the first page.
International Search Report and Written Opinion for PCT/US2013/52984, dated Dec. 11, 2013.

(Continued)

*Primary Examiner* — Jason Boeckmann
(74) *Attorney, Agent, or Firm* — Hahn Loeser & Parks LLP

(57) ABSTRACT

A foam spray gun is illustrated in which a third hose is attached to the gun for the application of either a liquid or a gas.

13 Claims, 10 Drawing Sheets

(56) References Cited

U.S. PATENT DOCUMENTS

2008/0296398 A1   12/2008   Hickman et al.
2009/0306674 A1*  12/2009   Chandler .................. 606/93
2010/0065130 A1    3/2010   Swab et al.

OTHER PUBLICATIONS

International Preliminary Report on Patentability for PCT/US2013/52984, dated Jun. 9, 2015.

* cited by examiner

FOAM DISPENSING GUN

CROSS-REFERENCE TO RELATED APPLICATIONS

This application claims priority to and fully incorporates by reference, U.S. patent application Ser. No. 61/679,240 filed on 3 Aug. 2012.

TECHNICAL FIELD OF THE INVENTION

The invention described herein relates generally to a two-component spray gun that utilizes a metering component to prevent uneven dispensing of components.

BACKGROUND OF THE INVENTION

This invention is particularly suited for in-situ applications of liquid chemicals mixed and dispensed as a spray or a foam and more specifically, to in-situ application of polyurethane foam or froth. In-situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in-situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is significantly different from the chemical reactions producing a polyurethane froth foam in a "two-component" polyurethane foam. Because the reactions are different, the dispensing of the chemicals for a two-component polyurethane foam involves different and additional concepts and concerns than those present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.). In a two-component polyurethane foam, the "A" and "B" components form the foam or froth when they are mixed in the gun. Of course, chemical reactions with moisture in the air will also occur with a two-component polyurethane foam after dispensing, but the principal reaction forming the polyurethane foam occurs when the "A" and "B" components are mixed or contact one another in the dispensing gun and/or dispensing gun nozzle. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam is enhanced by the pressurized gas employed, e.g., fluorocarbon (or similar) component, which is present in the "A" and "B" components. This fluorocarbon component is a compressed gas which exits in its liquid state under pressure and changes to it gaseous state when the liquid is dispensed into a lower pressure ambient environment, such as when the liquid components exit the gun and enter the nozzle.

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged (typically with an inert gas) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. This practice, typically leads to operator errors. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Another element affecting the operation of a two-component gun is the design of the nozzle. The nozzle is typically a throw away item detachably mounted to the nose of the gun. Nozzle design is important for cross-over and metering considerations in that the nozzle directs the "A" and "B" components to a static mixer within the tip. For example, one gun completely divides the nozzle into two passages by a wall extending from the nozzle nose to the mixer. The wall lessens but does not eliminate the risk of cross-over since the higher pressurized component must travel into the mixer and back to the lower pressure metering valve.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed as throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The dispensing gun of the present invention is particularly suited for use in two-component polyurethane foam "kits" typically sold to the building or construction trade. Typically, the kit contains two pressurized "A" and "B" cylinders (150-250 psi), a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

The Prior Art dispensing guns are typically "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The use of the term "airless" as used in this patent and the claims hereof means that the dispensing apparatus is not provided with an external, cleaning or purging mechanism.

Within each type of dispensing gun (e.g., one-component dispensing gun, two-component dispensing gun), a metering rod is utilized. The metering rod is a primary shutoff within the dispensing gun that meters or controls dispensing of material. The metering rod is often referred to as a needle or a pin and engages a female type receiver to meter or shutoff flow of chemical (e.g., material, component "A," component "B," etc.). In one-component dispensing guns, a single metering rod is included within a dispensing passage. In two-component dispensing guns, a metering rod is included within each dispensing passage associated with component (e.g., material). In an embodiment, two-component dispensing gun includes first dispensing passage and respective metering rod and second dispensing passage and respective metering rod. Upon use of a trigger, metering rod(s) allow material to be dispensed.

Fabrication of metering rods for dispensing guns include various challenges to produce an efficient dispensing gun at a reasonable price point. Typically, metering rods are fabricated incorporating brass, copper, and other materials (e.g., metallic, non-metallic, etc.). Yet, such materials have increased in cost and, in turn, increased cost of manufacturing dispensing guns. Furthermore, dispensing gun requires a secure mating between receiver and metering rod in order to prevent inconsistent metering (e.g., non-uniform dispensing of material, components, or chemical) and incomplete shut off (in a closed position). Inaccuracy between mating surfaces (e.g., receiver and metering rod) is typically overcome by forcing two elements together during initial assembly and allowing the more malleable of the two elements to take set. This technique is referred to as presetting and typically requires lengthy hold time which limits manufacturing of dispensing guns. Overall, presetting increases the possibility of enabling two mating surfaces to have secure connection (e.g., mating) to avoid leakage and/or non-uniform dispensing but adds to the manufacturing time.

Additionally, metallic metering rods are often fabricated with turning or grinding techniques. In particular, during creation of typical metallic metering rod(s), radial micro grooves are present due to such turning or grinding technique. With repeated use over duration of time, these micro grooves cause wear to the more malleable mating surface. In general, micro grooves grind or file away at the mating surface which can cause leakage of chemical/material at the mating surface.

While two-component dispensing guns discussed above function in a commercially acceptable manner, it is becoming increasingly clear as the number of in-situ applications for polyurethane foam increase, that the range or the ability of the dispensing gun to function for all such applications has to be improved. As a general example, metering rods that meter amount of dispensed material need to be fabricated in a manner that prevent uneven dispensing of materials as well as prevent incomplete shutoff.

Further limitations and disadvantages of conventional, traditional, and proposed approaches will become apparent to one of skill in the art, through comparison of such systems and methods with certain embodiments the claimed invention as set forth in the remainder of the present application with reference to the drawings.

SUMMARY OF THE INVENTION

In one embodiment of the invention, a foam spray gun is described in which a third input hose is provided for the spray gun in communication with said removable nozzle for dispensing a liquid or a gas. The gun will have a pivotable trigger for controlling dispensing of the polyol and diisocyanate in the pair of input hoses, and the gun will have a separate control mechanism for controlling dispensing of a liquid or gas from the third input hose.

In one aspect of the invention, the removable nozzle is temperature sensitive, although the affixing of a temperature sensitive tape to either the nozzle or at least one of the input hoses is also employed.

An improved ergonomic handle is illustrated wherein the handle is curvilinear, and optionally is a split handle having an opening within a pair of legs of said handle. The removable nozzle may be affixed to the front of the spray gun by a twist and click attachment or by a protected snap tab. The housing of the spray gun may optionally be modular.

Therefore, the invention at least partially resides in: a foam spray gun which comprises: a housing; a pair of input hoses for at least one polyol and at least one diisocyanate, the hoses in communication with an input for said hoses in the housing and a removable nozzle; a third input hose in communication with the removable nozzle for dispensing a liquid or a gas; a pivotable trigger for controlling dispensing of the at least one polyol and at least one diisocyanate in the pair of input hoses, the trigger adjacent a handle; and a control mechanism for controlling dispensing of the liquid or gas from the third input hose. The removable nozzle is optionally temperature sensitive (i.e., contains a temperature sensitive colorant which changes from a first to a second temperature with variations in temperature). This temperature sensor may be a temperature sensitive tape positioned on the nozzle or upon at least one hose. The said control mechanism for controlling dispensing from the third hose is typically positioned on the pivotable trigger or on a side of the housing of the spray gun or adjacent a handle of the spray gun. The nozzle is affixed to a front of said housing by a fastening mechanism including a twist and click attachment or a snap tab. In one aspect of the invention, the foam spray gun will include an output control lever for said pair of input hoses for high/low flow control. The spray gun is often modular. High/low flow control is often effected by pivotable control within the gun, the control being within a flow path within the gun and post ingress of the at least one polyol and the at least one diisocyanate. The spray gun often a safety lock biased in a locked position, said kick positioned on a front face of said pivotable trigger for controlling dispensing of said at least one polyol and said at least one diisocyanate. The pair of input hoses can either be upwardly canted to enter the gun from on top of the housing or from a bottom of the handle.

These and other advantages and novel features of the claimed invention, as well as details of illustrated embodiments thereof, will be more fully understood from the following description and drawings.

DETAILED DESCRIPTION OF THE INVENTION

The best mode for carrying out the invention will now be described for the purposes of illustrating the best mode known to the applicant at the time of the filing of this application. The examples are illustrative only and not meant to limit the invention, as measured by the scope and spirit of the claims.

Figure 1:
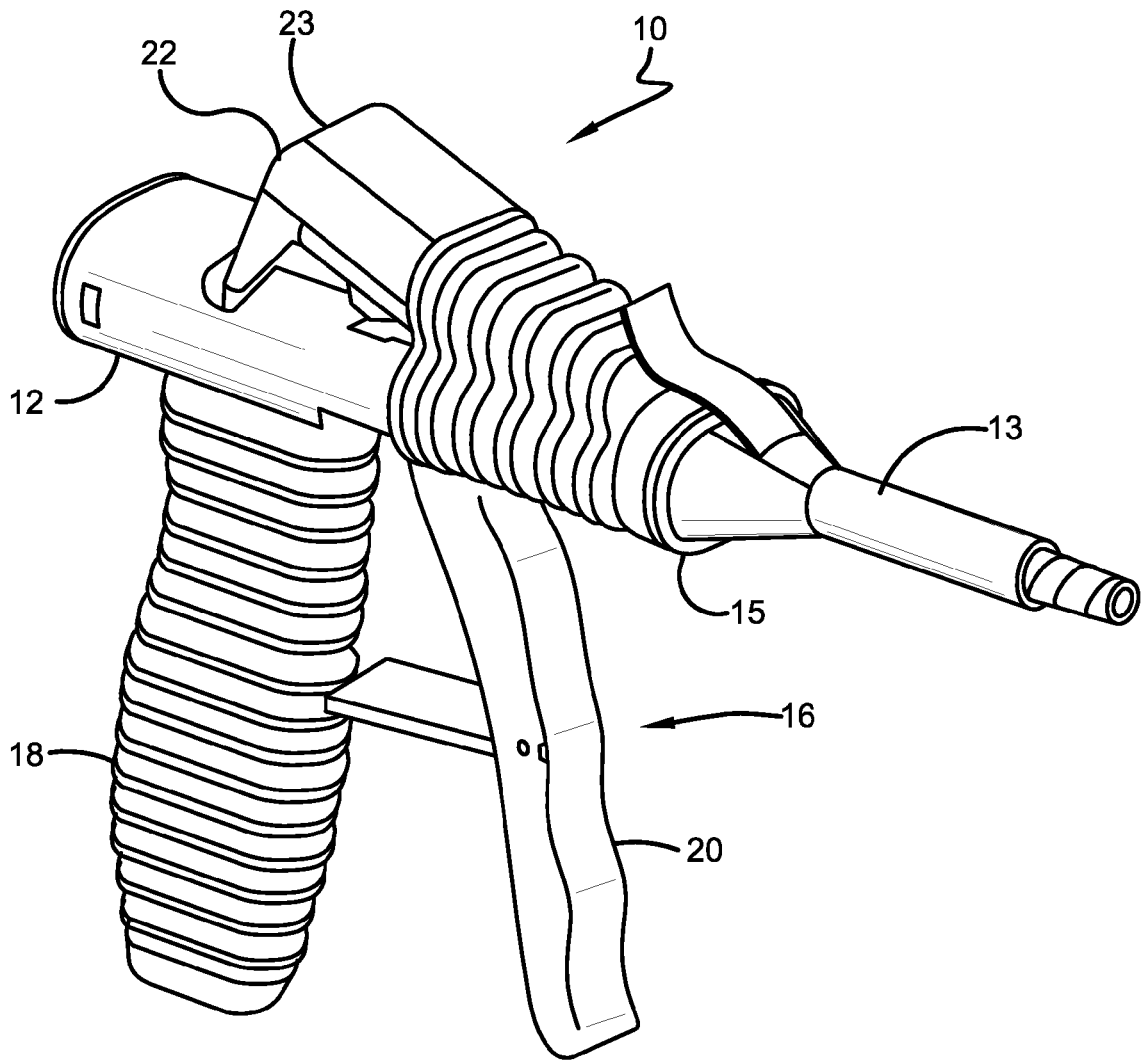
FIG. 1 illustrates a perspective view of a Prior Art dispensing gun.

FIG. 1 illustrates an airless two-component dispensing gun 10. Dispensing gun 10 may be viewed as comprising a one-piece gun body 12 (which includes components to be described) with a detachably secured disposable nozzle 13. In one preferred embodiment, the gun is molded from polypropylene and the nozzle is molded from an ABS (Acrylonitrile-Butadiene-Styrene) plastic. It is to be appreciated that any suitable plastic material can be utilized for the dispensing gun 10. While one of the objects of the invention is to provide an inexpensive dispensing gun achieved in part by the molding gun body 12 and nozzle 13 from plastic, the invention in its broader sense is not limited to a dispensing gun molded from any particular plastic and in a broader sense, includes metallic dispensing guns and/or dispensing guns with some metallic components.

Gun body 12 may be further defined as having integral portions including a longitudinally-extending valve portion 15 to which nozzle 13 is releasably connected and terminating at a longitudinally-extending trigger portion 16, in turn, terminating at longitudinally-extending spring portion (not shown) from which transversely extends handle portion 18. Within gun body housing 12 is a pair of hose openings 22, 23, canted as shown, to which the "A" and "B" hoses (not shown) are attached, respectively, by conventional quick connect couplings or other retaining mechanisms (e.g., friction fitting O-rings).

Dispensing gun 10 is also provided with pivotable trigger 20 extending within trigger body portion 16. It should be appreciated that when the operator grasps dispensing gun 10 about handle 18 for finger actuation of trigger 20, that the position of hose openings 22, 23 is such that the kit hoses will drape over the operator's forearm which is preferred over other conventional hose attachment positions on the dispensing gun. Canting hose openings 22, 23 is thus believed to provide some ergonomic benefit while contributing to the improved performance of dispensing gun 10 as described below. While a canted configuration is illustrated, the invention is not limited to that arrangement, and the "A" and "B" hoses may be positioned to enter the gun from the base of handle 18 (not shown).

Figure 2:
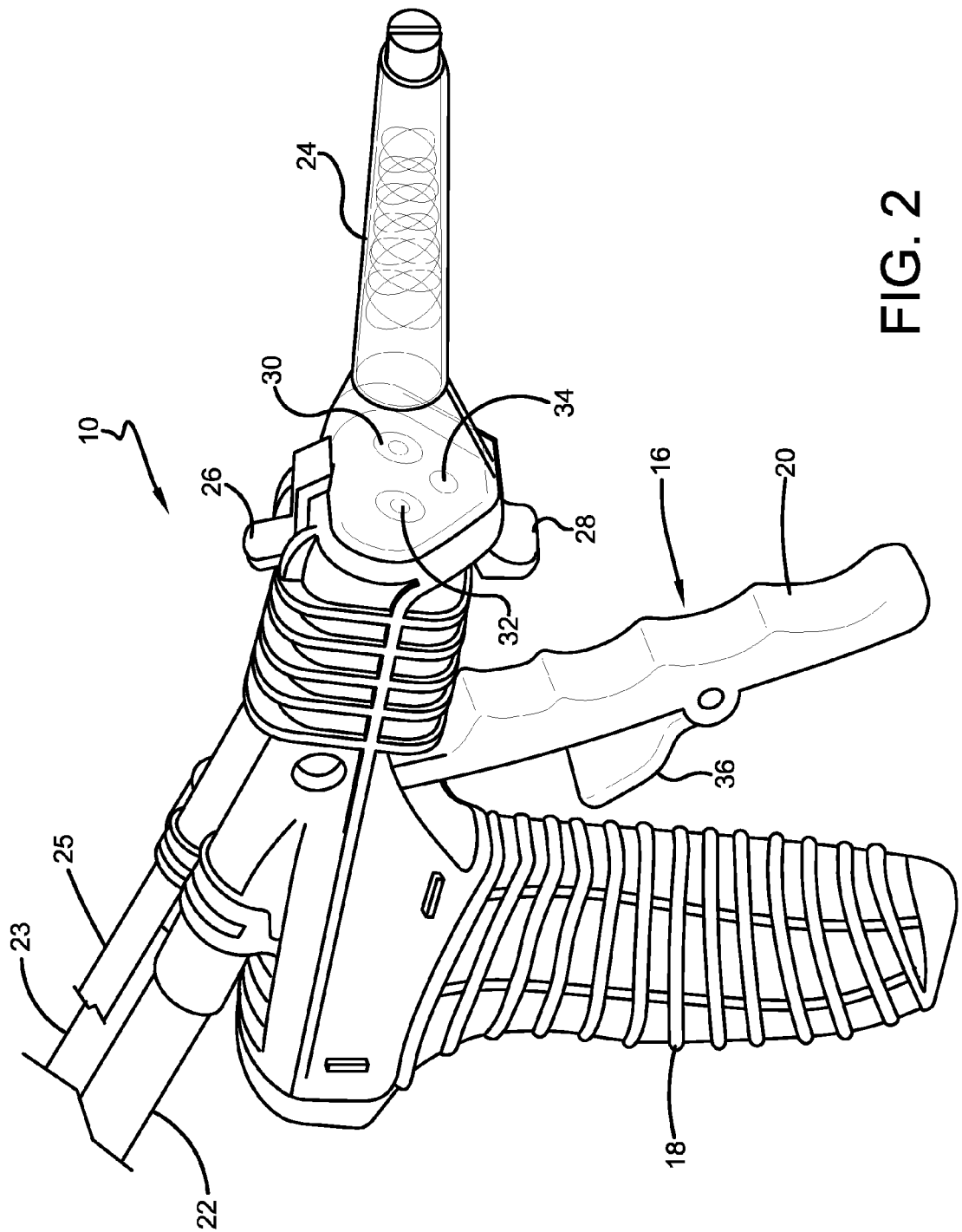
FIG. 2 illustrates a perspective view of one aspect of the invention in which a third stream input is illustrated, third stream control trigger and a temperature sensitive nozzle.

Referring now to FIG. 2, dispensing gun 10 is shown in a manner similar to FIG. 1, in which canting hose openings 22,23 are illustrated to communicate with removable nozzle 24 via openings 32, 30 respectively. Third hose opening 25 also communicates with removable nozzle 24 via opening 34. The value of having a third hose is that the user may supplement the options available through the use of this third hose and by control using third stream control trigger 28, may optionally dispense pressurized air (or other gas) to clean a surface upon which foam is to be applied, or to dispense a liquid cleaning medium through the nozzle (e.g., solvent). Wide safety lock 36 is accessed and controlled typically via thumb control by the user. In one aspect of the invention, nozzle 24 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio.

Figure 2A:
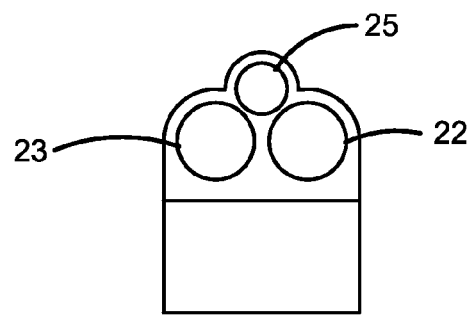
FIG. 2A illustrates a rear elevational view of the nozzle attachment of FIG. 2 showing the third hose positioned above the pair of input hoses.
Figure 2B:
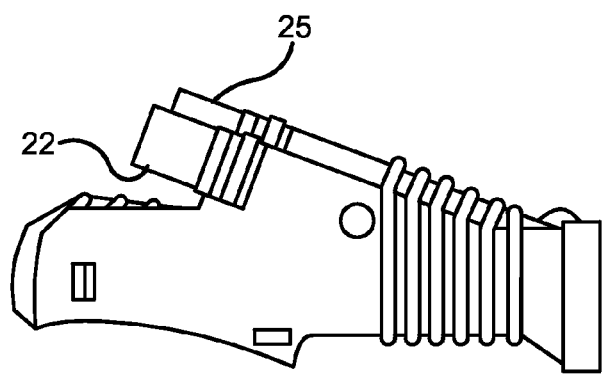
FIG. 2B illustrates a side elevational view of the housing portion of the spray gun of FIG. 2 in which the hose attachments are illustrated in an offset configuration as well as in a parallel configuration.
Figure 2B:
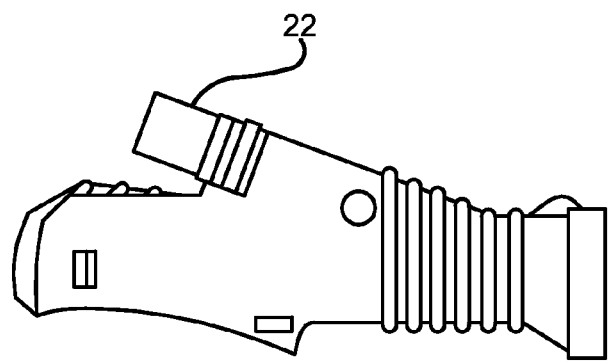

FIG. 2A illustrates an embodiment where the pair of canted openings 22,23 are positioned below the third hose opening 25 whereas FIG. 2B illustrates an arrangement wherein the input hoses are in a non-parallel configuration as well as a parallel configuration. It is recognized that color-sensitive dyes and pigments may be incorporated into the plastic of nozzle 24.

Figure 3:
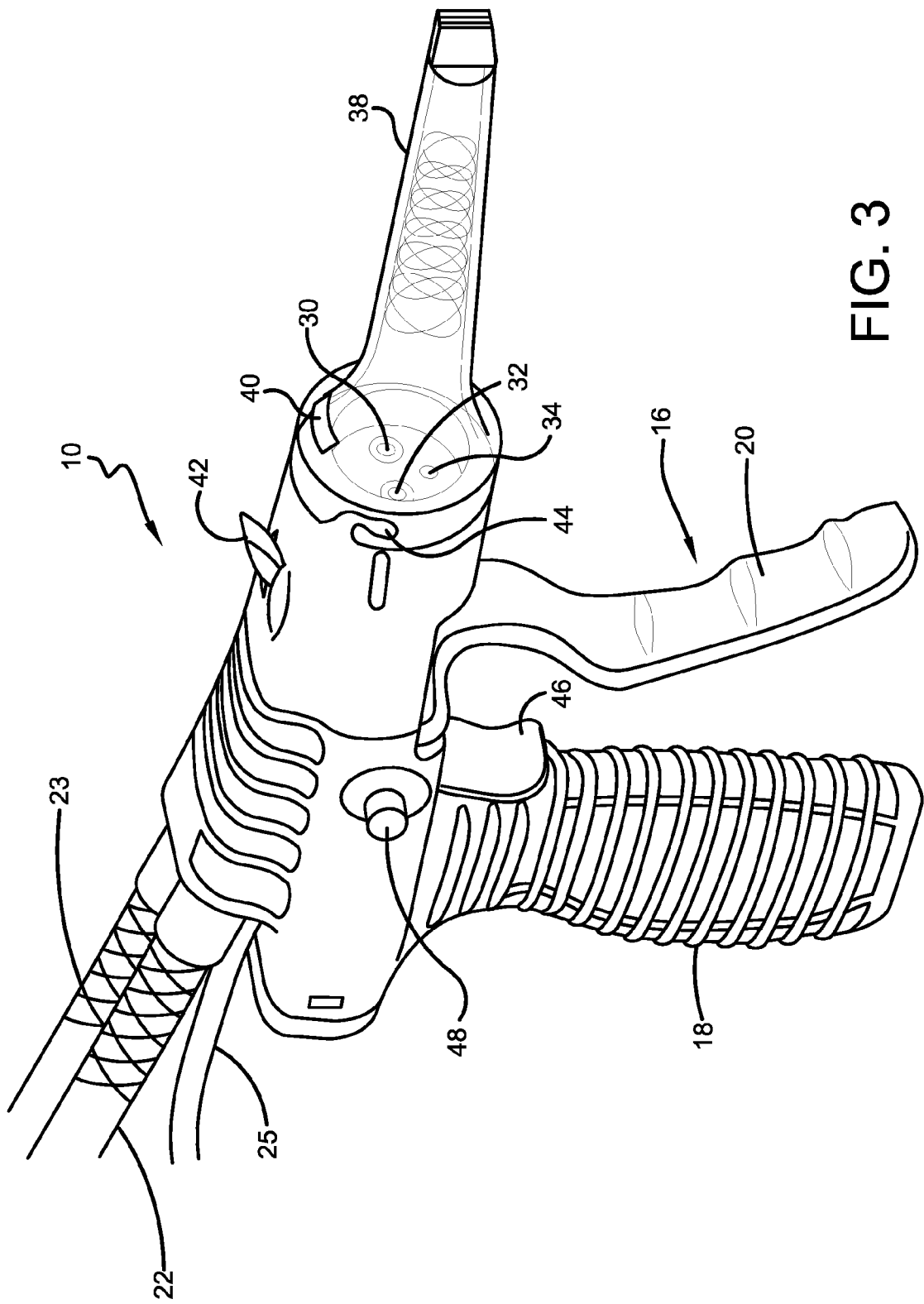
FIG. 3 illustrates a perspective view of one aspect of the invention in which a third stream input is illustrated with corresponding third stream trigger control, high/low output control and twist and "click" nozzle and temperature sensitive tape on the nozzle.
Figure 3A:
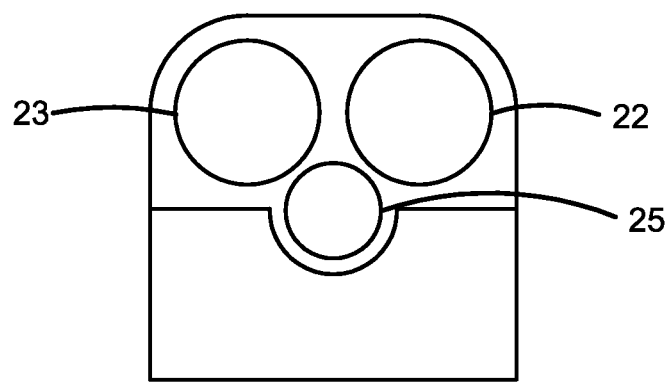
FIG. 3A illustrates a rear elevational view of the nozzle attachment of FIG. 3 showing the third hose positioned below the pair of input hoses.
Figure 3B:
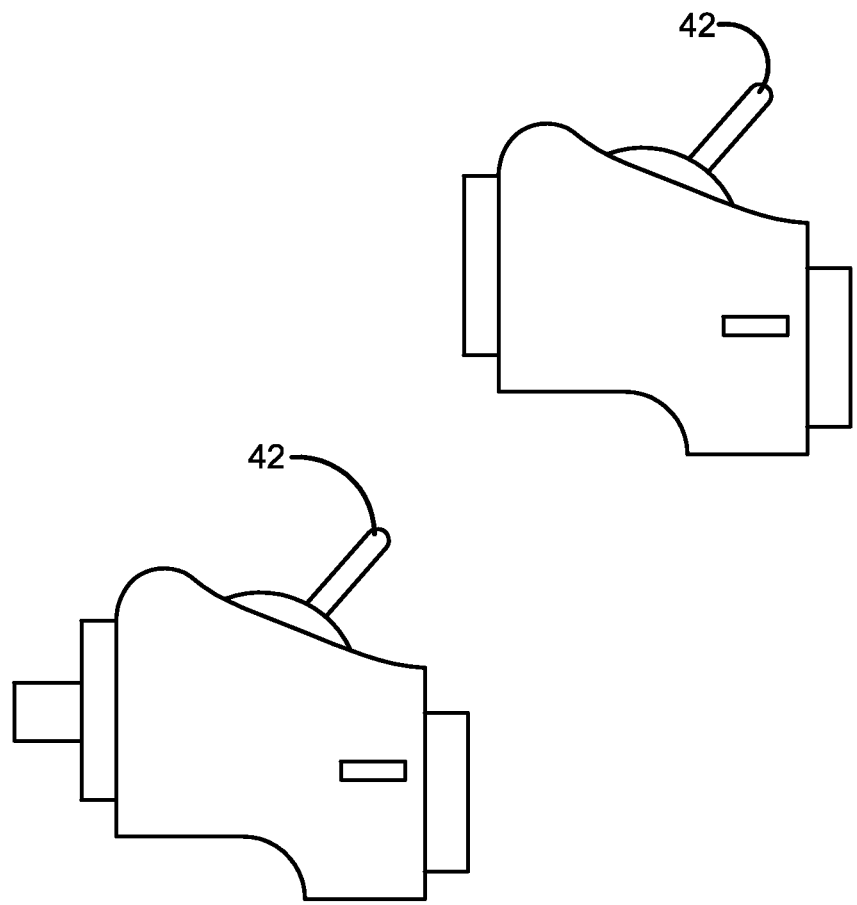
FIG. 3B illustrates a side elevational view of the housing portion of the spray gun of FIG. 3 in which the housing has a high throughput ability as well as a more restricted throughput.

As better illustrated in FIG. 3, dispensing gun 10 is shown in which removable nozzle 38 is affixed by a "twist and click" nozzle 44 and further in which third stream trigger control is provided by pivotable trigger 46 adjacent handle 18. Temperature sensitive tape 40 is affixed to nozzle 38 wherein the tape changes color depending upon the temperature of the dispensed chemicals for the reasons opined in the previous paragraph. The dispensing gun is further provided with high/low output control lever 42 for further control by an operator. As shown in FIG. 3A, the pair of canted openings 22,23 are positioned above the third hose opening 25 whereas FIG. 3B illustrates the high and low volume throughput control of output control lever 42. Further illustrated is safety lock 48 positioned optimally on both sides of spray gun 10.

Figure 4:
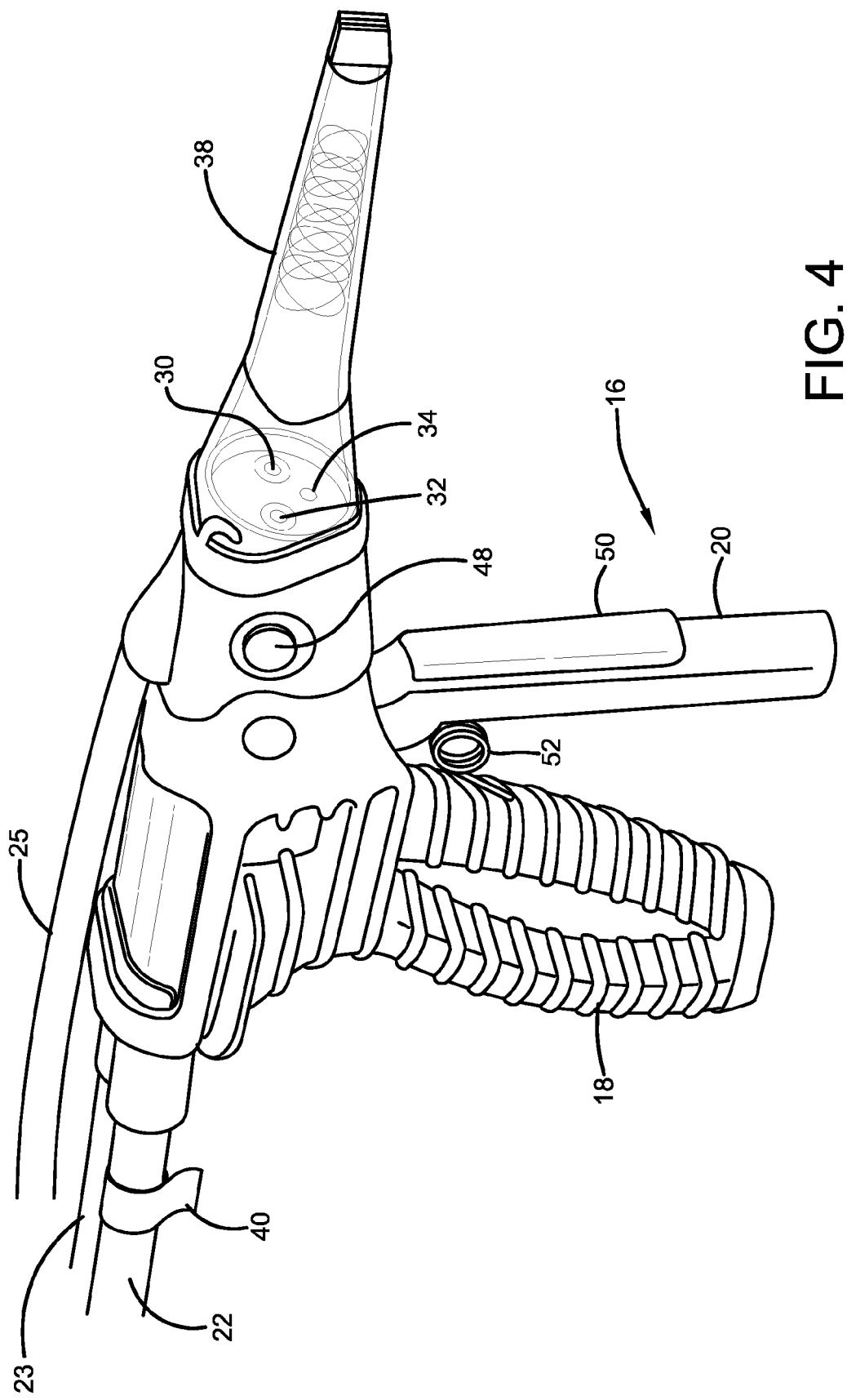
FIG. 4 illustrates a perspective view of one aspect of the invention in which a third stream input is illustrated with temperature sensitive tape on at least one of the input hoses, twist and "click" nozzle, third stream control via a push button on both sides and an "automatic" safety lock.

As shown in FIG. 4, dispending gun 10 is shown in which removable nozzle 38 is affixed by the "twist and click" nozzle 44 of FIG. 3 and further wherein third hose 25 enters adjacent removable nozzle 38. Temperature sensitive tape is affixed to at least one hose 22, more preferably both hoses. Handle 18 is split into two legs, preferably connected at the bottom. Automatic safety lock 50 is positioned upon an exterior-facing side of trigger 50 which is biased in an "off" position by spring-biased trigger 52. Third stream control is effected by push button 48 positioned on both sides of the gun housing.

Figure 5A:
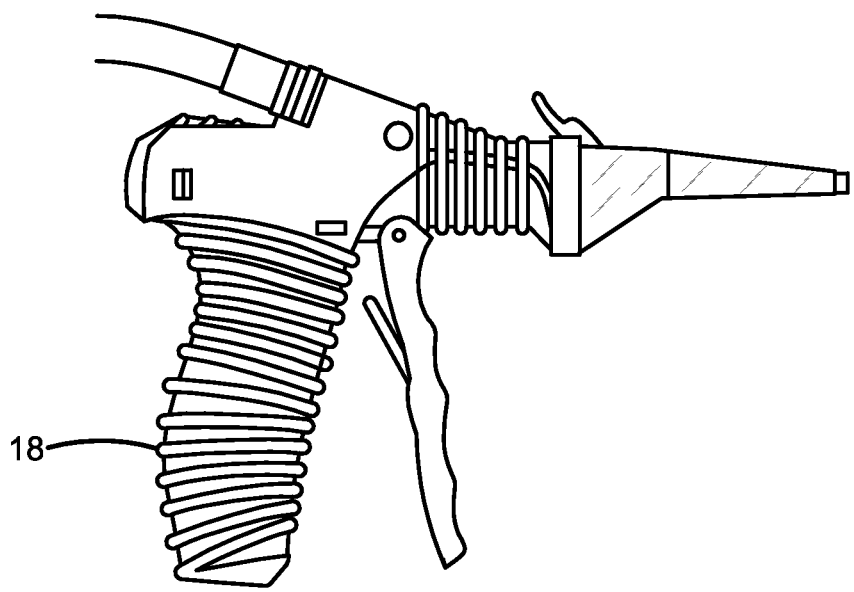
FIG. 5A illustrates a side elevational view of a Prior Art spray gun.
Figure 5B:
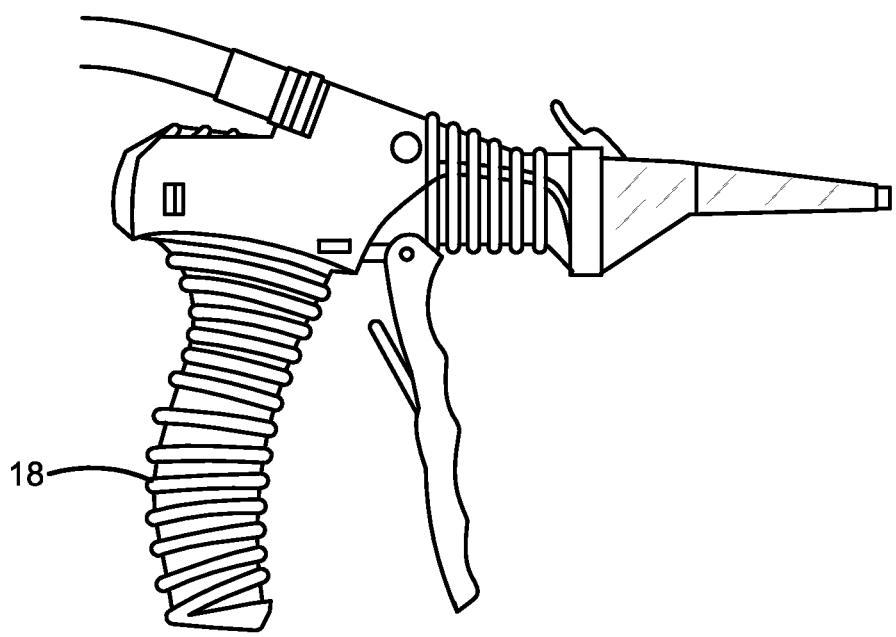
FIG. 5B illustrates a side elevational view of a more ergonomic spray gun with a different handle design.

FIG. 5A illustrates a Prior Art spray gun and handle having a significant amount of plastic in handle 18. As depicted in FIG. 5B, in some instances, a more ergonomic handle is preferred by some users in which the handle is thinner both longitudinally and horizontally as well as more curvilinear in shape.

Figure 6A:
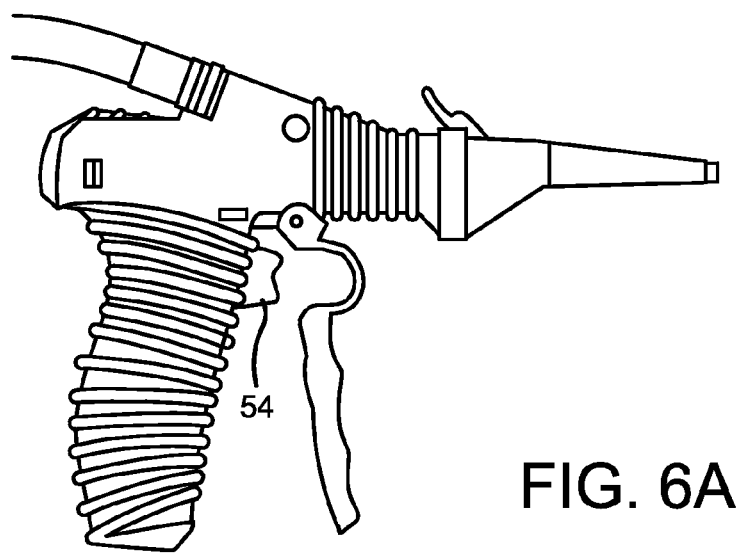
FIGS. 6A, 6B, and 6C illustrate a side elevational view of different locations for the third stream trigger.
Figure 6B:
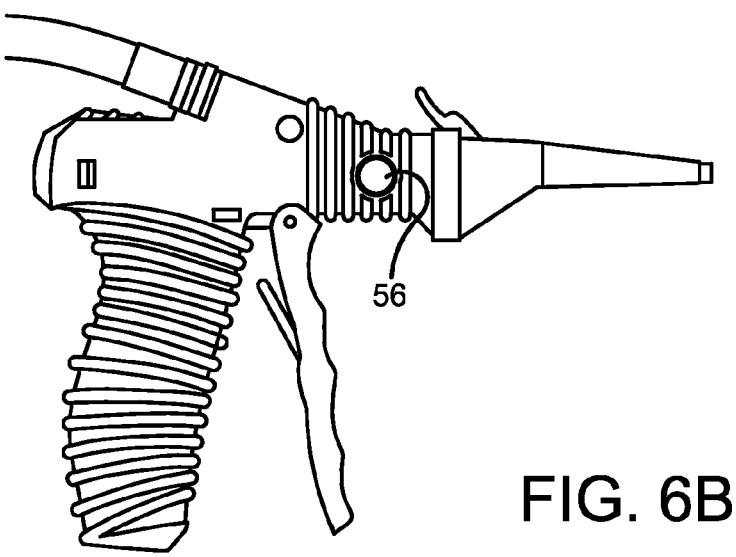
Figure 6C:
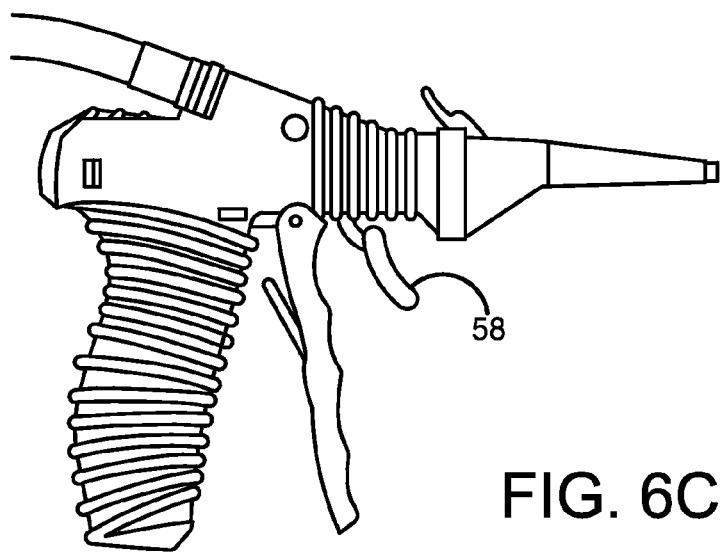

FIGS. 6A, 6B & 6C illustrate varying locations for third stream control trigger 54, 56 & 58.

Figure 7A:
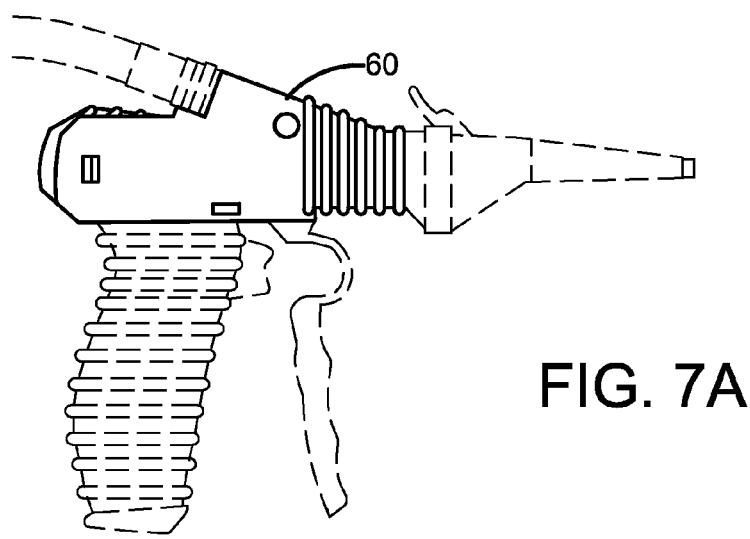
FIGS. 7A, 7B, and 7C illustrate a side elevational view of different modular concepts for the spray gun.
Figure 7B:
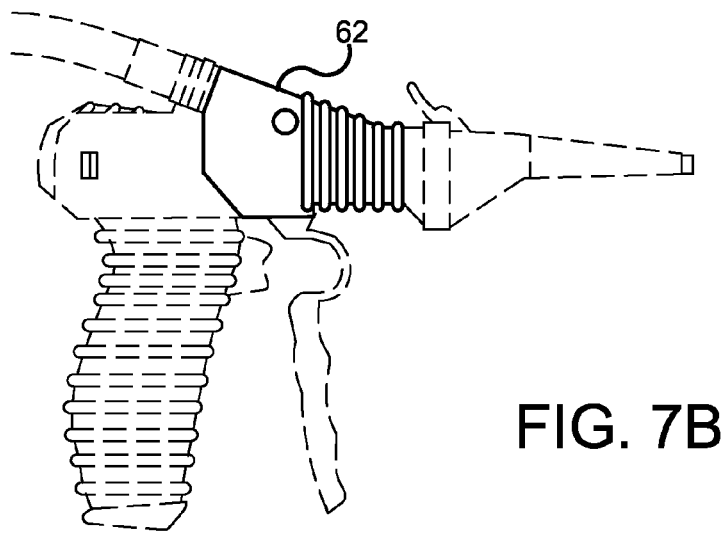
Figure 7C:
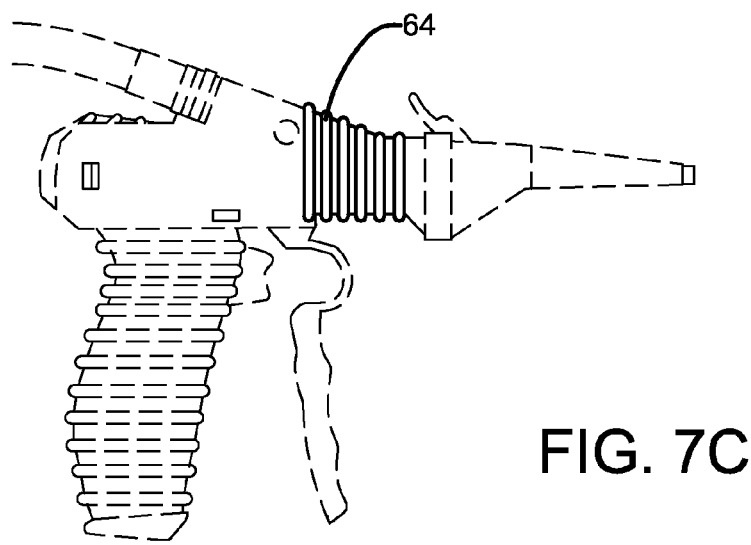

FIGS. 7A, 7B & 7C illustrate varying degrees of modularity of the foam spray gun in which varying parts of housing 60, 62 & 64 are constructed in a modular fashion.

Figure 8:
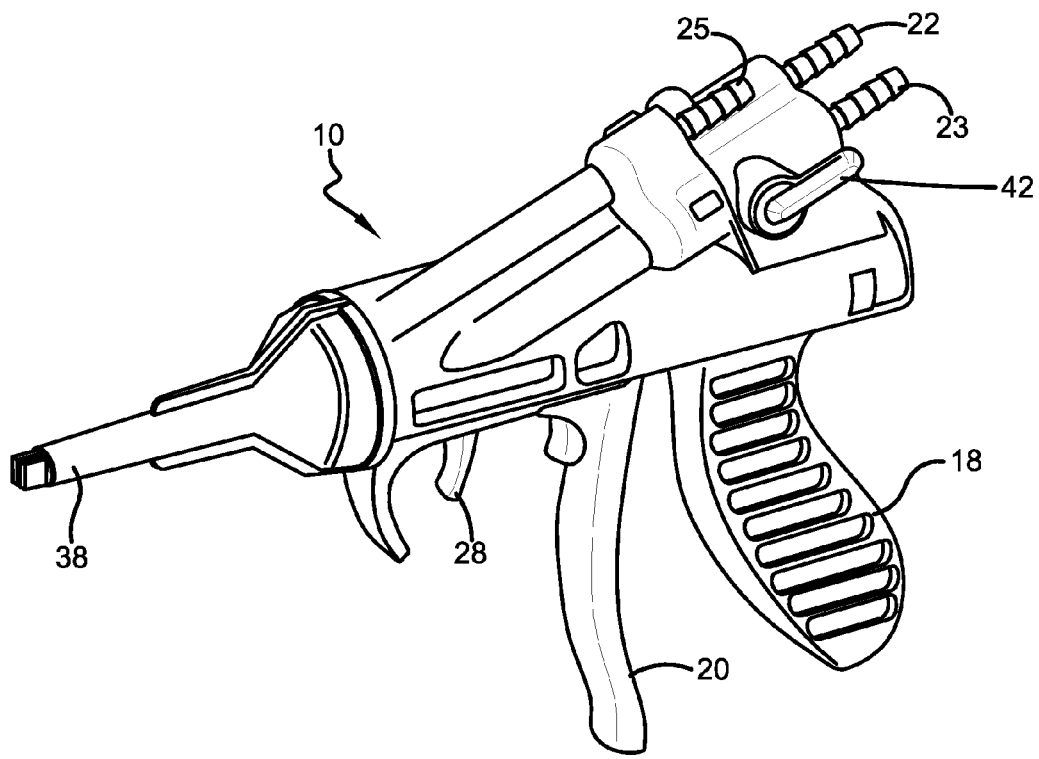
FIG. 8 illustrates a perspective view of the spray gun with a third stream forward of the dispensing trigger.

FIG. 8 illustrates another arrangement of a spray gun and nozzle. As illustrated, spray gun 10 has a pair of canting hose openings 22,23 in communication with removable nozzle 38. Third hose opening 25 also communicates with removable nozzle 38. Safety lock 48 is pivotally positioned within dispensing trigger 20 which is positioned before rearward-sloping curvilinear handle 18. Safety lock 48 is accessed and controlled typically via index finger control by the user. In one aspect of the invention, "twist and click" nozzle 38 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio. Third stream trigger 28 is pivotally positioned in front of pivotable dispensing trigger 20 and governs the flow of the fluid (liquid or gas) within the channel of third hose 25. The dispensing gun is further provided with high/low or on/off output control lever 42 for further control by an operator. When used for high/low flow control, different diametered channels are bored into a transverse shaft of control lever 42.

Figure 9:
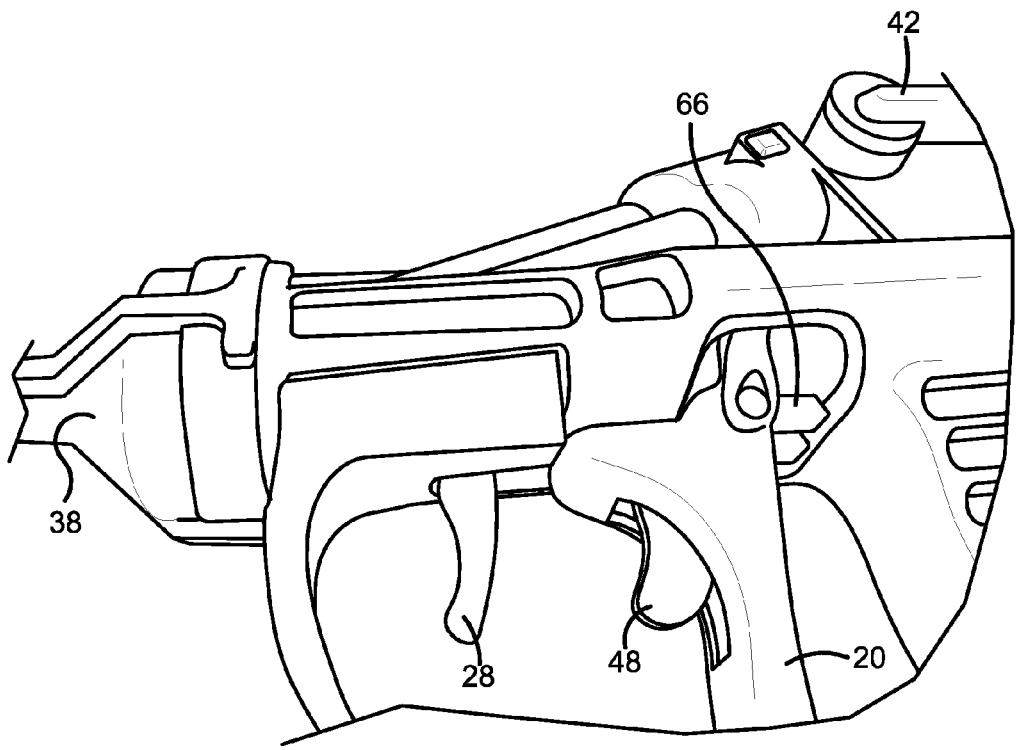
FIG. 9 illustrates an exploded view of the yoke of the safety trigger.

FIG. 9 illustrates yoke 66 of safety lock 48 positioned within dispensing nozzle 20. As illustrated in the figure, safety lock is biased in a forward direction with yoke 66 impinging upon a rear lip. Depressing safety lock 48 pivotally elevates yoke 66 so as to permit rearward movement of pivotable dispensing trigger.

The color-changing aspects of the invention above, use thermochromism which is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 um (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethylamino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. (15.6° C.) to transparent or translucent above 60° F. (15.6° C.). If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition to the above, it should be understood that many alterations and permutations are possible. Any of a variety of colors and shades can be mixed in order to undergo color changes as a function of temperature.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A foam spray gun which comprises:
   a housing;
   a pair of upwardly canted input hoses for at least one polyol and at least one diisocyanate, said hoses in communication with an input for said hoses in said housing and a removable nozzle;
   a third upwardly canted input hose in communication with said removable nozzle for dispensing a liquid or a gas and positioned above the pair of upwardly canted input hoses for the at least one polyol and at least one diisocyanate;
   a first pivotable trigger for controlling dispensing of said at least one polyol and said at least one diisocyanate in said pair of input hoses, said trigger adjacent a handle;
   a second pivotable trigger forward of said first pivotable trigger for controlling dispensing of said liquid or gas from said third input hose; and
   an output control lever for said pair of input hoses, said output control lever positioned on an upwardly canted portion of said housing and adjacent an input for the upwardly canted hoses.

2. The foam spray gun of claim 1, wherein
   said removable nozzle is temperature sensitive changing from a first color to a second color upon a temperature change within said nozzle.

3. The foam spray gun of claim 1, wherein
said control mechanism for controlling a dispensing from said third hose is positioned adjacent a handle of said spray gun.

4. The foam spray gun of claim 1, wherein
said handle is curvilinear.

5. The foam spray gun of claim 1, wherein
said nozzle is affixed to a front of said housing by a twist and click attachment.

6. The foam spray gun of claim 1, which further comprises:
a high/low pivotable control within said gun, said control within a flow path within said gun and post ingress of said at least one polyol and said at least one diisocyanate and independent of a position of the first trigger.

7. The foam spray gun of claim 1, which further comprises:
a third pivotable safety lock trigger biased in a locked position, said third pivotable safety lock trigger extending forward from a slot in a front face of said first pivotable trigger for controlling dispensing of said at least one polyol and said at least one diisocyanate.

8. The foam spray gun of claim 1, wherein
said pair of input hoses are upwardly canted to enter said gun from on top of a housing of said gun.

9. A foam spray gun which comprises:
a housing;
a pair of upwardly canted input hoses for at least one polyol and at least one diisocyanate, said hoses in communication with an input for said hoses in said housing and a removable nozzle;
an upwardly canted third input hose in communication with said removable nozzle for dispensing a liquid or a gas and positioned above the pair of upwardly canted input hoses for the at least one polyol and at least one diisocyanate;
a first pivotable trigger for controlling dispensing of said at least one polyol and said at least one diisocyanate in said pair of input hoses, said trigger adjacent a handle;
a third pivotable safety lock trigger positioned near a top of the first pivotable trigger for controlling dispensing of the at least one polyol and at least one diisocyanate, the third pivotable safety lock trigger extending forward from a slot in a front face of said first pivotable trigger;
a second pivotable trigger forward of said first pivotable trigger for controlling dispensing of said liquid or gas from said third input hose; and
a high/low or on/off pivotable control within said gun, said control within a flow path within said gun and post ingress of either
said at least one polyol and said at least one diisocyanate or said third input hose,
said high/low or on/off pivotable control independent of a position of the first trigger.

10. The foam spray gun of claim 9, which further comprises:
a removable nozzle which is temperature sensitive changing from a first color to a second color upon a temperature change within said nozzle.

11. The foam spray gun of claim 9, wherein
the first pivotable trigger comprises a third pivotable safety lock trigger disposed within a slot in the first pivotable trigger, the third pivotable safety lock trigger biased in a locked position.

12. A foam spray gun which comprises:
a housing;
a pair of upwardly canted input hoses for at least one polyol and at least one diisocyanate, said hoses in communication with an input for said hoses in said housing;
a pressurized gas propellant for said at least one polyol and said at least one diisocyanate;
a temperature displaying removable nozzle affixable to a front of the housing, the nozzle changing from a first color to a second color upon a temperature change within the nozzle;
the removable nozzle comprising a static mixer for mixing an aerosol of said at least one polyol and said at least one diisocyanate;
an upwardly canted third input hose in communication with said removable nozzle for dispensing a liquid or a gas and positioned above the pair of upwardly canted input hoses for the at least one polyol and at least one diisocyanate;
a first pivotable trigger for controlling dispensing of said at least one polyol and said at least one diisocyanate in said pair of input hoses, said trigger adjacent a handle;
a second pivotable trigger forward of said first pivotable trigger for controlling dispensing of said liquid or gas from said third input hose;
a third pivotable safety lock trigger positioned near a top of the first pivotable trigger for controlling dispensing of the at least one polyol and at least one diisocyanate, the third pivotable safety lock trigger extending forward from a slot in a front face of said first pivotable trigger; and
a high/low or on/off pivotable control within said gun, said control within a flow path within said gun and post ingress of either
said input for said pair of upwardly canted hoses for said at least one polyol and said at least one diisocyanate or said third input hose,
said high/low or on/off pivotable control independent of a position of the first trigger.

13. A foam spray gun which comprises:
a housing;
a pair of upwardly canted input hoses for at least one polyol and at least one diisocyanate, said hoses in communication with an input for said hoses in said housing;
a pressurized gas propellant for said at least one polyol and said at least one diisocyanate, a combination of said pressurized gas propellant and said at least one polyol and said at least one diisocyanate creating an aerosol;
a temperature displaying removable nozzle affixable to a front of the housing, the nozzle changing from a first color to a second color upon a temperature change within the nozzle;
the removable nozzle comprising a static mixer for mixing the aerosol of said at least one polyol and said at least one diisocyanate;
an upwardly canted third input hose in communication with said removable nozzle for dispensing a liquid or a gas and positioned above the pair of upwardly canted input hoses for the at least one polyol and at least one diisocyanate;
a first pivotable trigger for controlling dispensing of said at least one polyol and said at least one diisocyanate in said pair of input hoses, said trigger adjacent a handle;
a second pivotable trigger forward of said first pivotable trigger for controlling dispensing of said liquid or gas from said third input hose;
a third pivotable safety lock trigger positioned near a top of the first pivotable trigger for controlling dispensing of the at least one polyol and at least one diisocyanate, the third pivotable safety lock trigger extending forward from a slot in a front face of said first pivotable trigger; and a high/low or on/off pivotable control within said gun, said
control within a flow path within said gun and post
ingress of either
said input for said pair of upwardly canted hoses for said
at least one polyol and said at least one diisocyanate or
said third input hose,
said high/low or on/off pivotable control independent of
a position of the first trigger.

* * * * *